(12) United States Patent
Wang et al.

(10) Patent No.: US 12,431,923 B2
(45) Date of Patent: Sep. 30, 2025

(54) COMMUNICATIONS DEVICE AND METHOD FOR COMPENSATING FREQUENCY RESPONSE DISTORTION OF COMMUNICATIONS DEVICE

(71) Applicant: Realtek Semiconductor Corp., HsinChu (TW)

(72) Inventors: Wu-Chi Wang, HsinChu (TW); Yuan-Shuo Chang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 440 days.

(21) Appl. No.: 18/105,892

(22) Filed: Feb. 6, 2023

(65) Prior Publication Data

US 2023/0253995 A1    Aug. 10, 2023

(30) Foreign Application Priority Data

Feb. 9, 2022    (TW) .................................. 111104677

(51) Int. Cl.
*H04B 1/04* (2006.01)
*H04B 1/62* (2006.01)

(52) U.S. Cl.
CPC ............. *H04B 1/0475* (2013.01); *H04B 1/62* (2013.01); *H04B 2001/0425* (2013.01); *H04B 2001/0433* (2013.01)

(58) Field of Classification Search
CPC .................... H04B 1/0475; H04B 1/62; H04B 2001/0425; H04B 2001/0433
USPC ...................................................... 455/552.1
See application file for complete search history.

(56) References Cited

U.S. PATENT DOCUMENTS

| | | | |
|---|---|---|---|
| 10,700,722 B1* | 6/2020 | Pratt | H03F 1/3241 |
| 2003/0058959 A1* | 3/2003 | Rafie | H04L 27/368 375/296 |
| 2003/0184372 A1* | 10/2003 | Fudaba | H03F 1/3247 330/149 |
| 2008/0187035 A1* | 8/2008 | Nakamura | H03F 3/245 375/232 |
| 2012/0064847 A1* | 3/2012 | Xu | H03F 1/3241 455/114.3 |
| 2012/0068768 A1* | 3/2012 | Ishikawa | H03F 3/189 330/149 |

(Continued)

*Primary Examiner* — Michael R Neff
(74) *Attorney, Agent, or Firm* — Winston Hsu (57) ABSTRACT

A communications device and a method for compensating frequency response distortion of the communications device are provided. The communications device includes a transmitting path circuitry, a receiving path circuitry, a pre-distortion circuit and a pre-equalizer circuit. The transmitting path circuitry generates an output test signal according to a pre-distortion test signal, and the receiving path circuitry generates a first feedback signal according to the output test signal, where the pre-distortion circuit is calibrated according to the first feedback signal. After calibration of the pre-distortion circuit is finished, the pre-distortion circuit generates a second feedback signal according to a single tone signal, where the pre-equalizer circuit is calibrated according to the second feedback signal. After calibration of the pre-equalizer circuit is finished, a transmission signal is processed by the pre-equalizer circuit and the pre-distortion circuit first and then output via the transmitting path circuitry to outside the communications device.

12 Claims, 8 Drawing Sheets

(56) References Cited

U.S. PATENT DOCUMENTS

2016/0065147 A1* 3/2016 Pratt .................. H03F 3/195
                                                    330/75
2016/0204881 A1  7/2016 Chung
2018/0131502 A1  5/2018 Askar

* cited by examiner

COMMUNICATIONS DEVICE AND METHOD FOR COMPENSATING FREQUENCY RESPONSE DISTORTION OF COMMUNICATIONS DEVICE

BACKGROUND OF THE INVENTION

1. Field of the Invention

The present invention is related to signal pre-processing of communications devices, and more particularly, to a communications device and a method for compensating frequency response distortion of the communications device.

2. Description of the Prior Art

In current wireless wideband communications devices, various signal processing methods are utilized to improve linearity. These signal processing methods have some disadvantages, however. For example, when these signal processing methods perform pre-processing on a signal within a wireless wideband communications device for the purpose of improving the linearity, a frequency response of this wireless wideband communications device may be distorted due to the pre-processing.

Thus, there is a need for a novel method and associated architecture to solve the problem of the related art without introducing any side effect or in a way that is less likely to introduce side effects.

SUMMARY OF THE INVENTION

An objective of the present invention is to provide a communications device and a method for compensating frequency response distortion of the communications device which can improve linearity of the communications device without introducing any frequency response distortion or in a way that is less likely to introduce frequency response distortion.

At least one embodiment of the present invention provides a communications device. The communications device comprises a transmitting path circuitry, a receiving path circuitry, a pre-distortion circuit and a pre-equalizer circuit, wherein the pre-distortion circuit and the pre-equalizer circuit are electrically coupled with the transmitting path circuitry. The transmitting path circuitry is configured to generate an output test signal according to a pre-distortion test signal, and the receiving path circuitry is configured to generate a first feedback signal according to the output test signal, wherein the pre-distortion circuit is calibrated according to the first feedback signal. After calibration of the pre-distortion circuit is finished, the pre-distortion circuit generates a second feedback signal according to a single tone signal, wherein the pre-equalizer circuit is calibrated according to the second feedback signal. More particularly, after calibration of the pre-equalizer circuit is finished, a transmission signal is processed by the pre-equalizer circuit and the pre-distortion circuit first, and then output to outside the communications device via the transmitting path circuitry.

At least one embodiment of the present invention provides a method for compensating frequency response distortion of a communications device. The method comprises: utilizing a transmitting path circuitry of the communications device to generate an output test signal according to a pre-distortion test signal; utilizing a receiving path circuitry of the communications device to generate a first feedback signal according to the output test signal; calibrating a pre-distortion circuit of the communications device according to the first feedback signal; after calibration of the pre-distortion circuit is finished, utilizing the pre-distortion circuit to generate a second feedback signal according to a single tone signal; and calibrating a pre-equalizer circuit of the communications device according to the second feedback signal. More particularly, after calibration of the pre-equalizer circuit is finished, a transmission signal is processed by the pre-equalizer circuit and the pre-distortion circuit first, and then output to outside the communications device via the transmitting path circuitry.

According to the communications device and the method provided by the embodiments of the present invention, the pre-equalizer circuit can compensate frequency response distortion caused by performing pre-processing on a path circuitry comprising low pass filter(s). In addition, the embodiments of the present invention will not greatly increase additional costs. Thus, the present invention can solve the problem of the related art without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
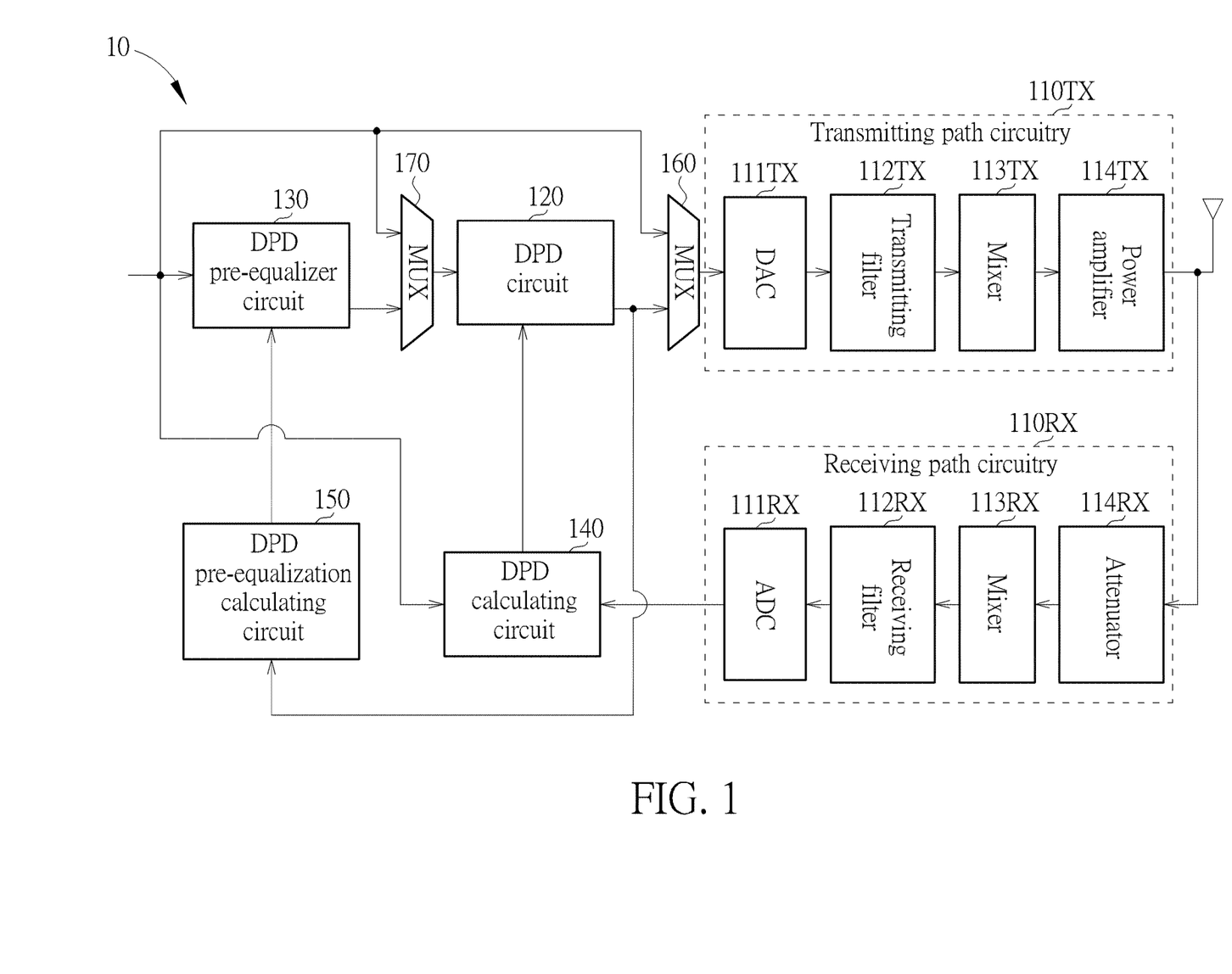
FIG. 1 is a diagram illustrating estimation of digital pre-distortion (DPD) coefficients in a communications device according to an embodiment of the present invention.

FIG. 1 is a diagram illustrating estimation of digital pre-distortion (DPD) coefficients in a communications device such as a transceiver 10 according to an embodiment of the present invention. As shown in FIG. 1, the transceiver 10 may comprise a transmitting path circuitry 110TX, a receiving path circuitry 110RX, a DPD circuit 120 and a DPD pre-equalizer circuit 130. In this embodiment, the transmitting path circuitry 110TX may comprise a digital-to-analog converter (DAC) 111TX, a transmitting filter 112TX, a mixer 113TX and a power amplifier 114TX, and the receiving path circuitry 110RX may comprise an analog-to-digital converter (ADC) 111RX, a receiving filter 112RX, a mixer 113RX and an attenuator 114RX. In this embodiment, the transceiver 10 may further comprise a DPD calculating circuit 140 and a DPD pre-equalization calculating circuit 150, where the transceiver 10 may utilize the DPD calculating circuit 140 to calibrate the DPD circuit 120 first, and then utilize the DPD pre-equalization calculating circuit 150 to calibrate the DPD pre-equalizer circuit 130. In particular, after calibration of the DPD circuit 120 is finished, the DPD circuit 120 may be configured to compensate non-linear distortion of the power amplifier 114TX within the transmitting path circuitry 110TX; and after calibration of the DPD pre-equalizer circuit 130 is finished, the DPD pre-equalizer circuit 130 may be configured to compensate frequency response distortion generated by the DPD circuit 120 being calibrated under a condition of either of the transmitting path circuitry 110TX and the receiving path circuitry 110RX comprising a filter (e.g. the transmitting filter 112TX and/or the receiving filter 112RX). For example, when the transmitting path circuitry 110TX and/or the receiving path circuitry 110RX comprise any filter, the DPD circuit 120 may generate frequency response distortion according to a frequency response of this filter after the DPD circuit 120 is calibrated, and this frequency response distortion may be compensated or canceled by the DPD pre-equalizer circuit 130. In addition, both the DPD circuit 120 and the DPD pre-equalizer circuit 130 are electrically coupled at a front-end of the transmitting path circuitry 110TX, and after calibration of both the DPD circuit 120 and the DPD pre-equalizer circuit 130 are finished, a transmission signal may be processed by the DPD pre-equalizer circuit 130 and the DPD circuit 120 first, and then be output to outside the transceiver 10 via the transmitting path circuitry 110TX (e.g. via an antenna electrically coupled to the transmitting path circuitry 110TX). In this embodiment, the transceiver 10 may utilize multiplexers (MUXs) 160 and 170 therein to control calibration signal paths of the DPD circuit 120 and the DPD pre-equalizer circuit 130 (e.g. utilizing a controller therein to generate multiple control signals respectively for controlling the MUXs 160 and 170 to select to enable one of an upper path circuitry and a lower path circuitry thereof); details related to the calibration of the DPD circuit 120 and the DPD pre-equalizer circuit 130 will be described in subsequent paragraphs.

Figure 2:
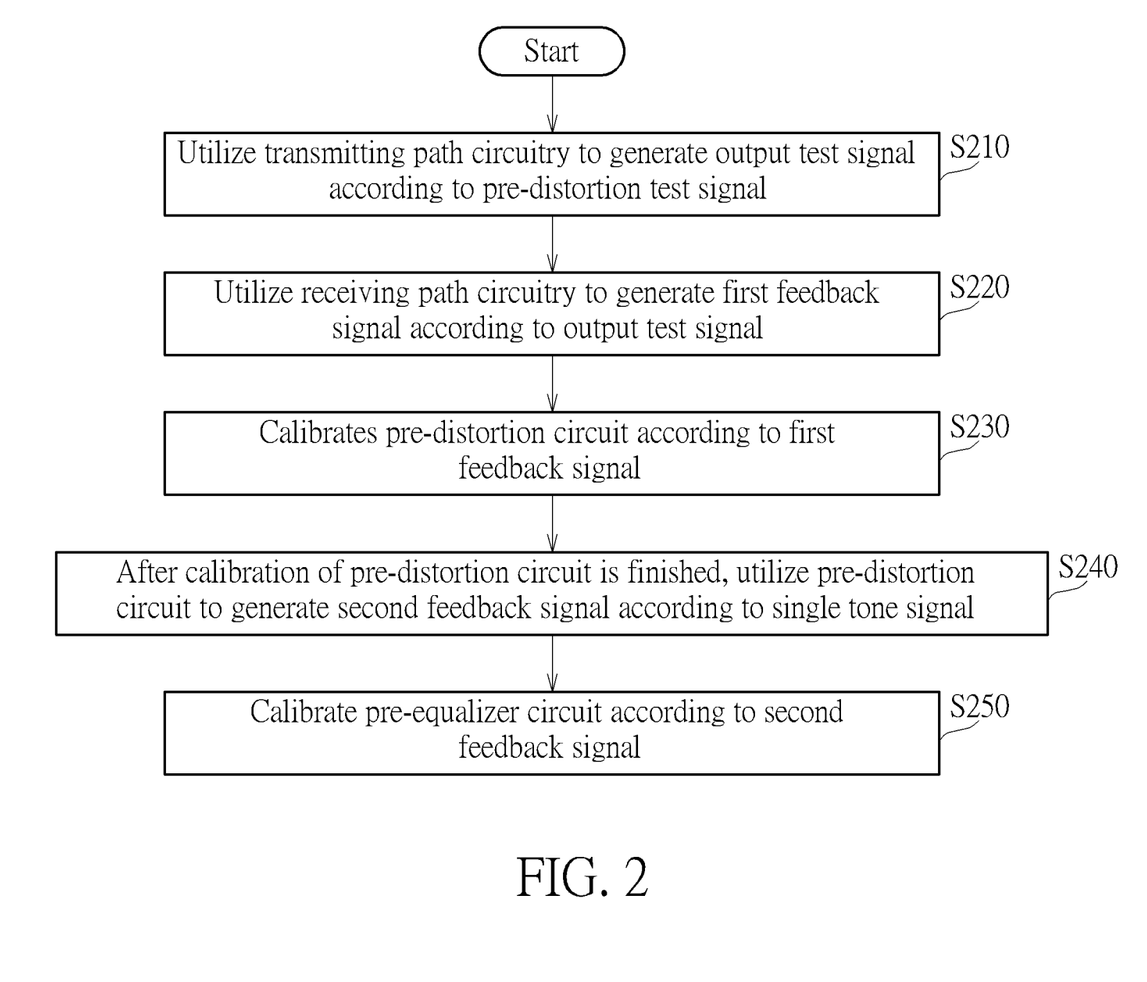
FIG. 2 is a diagram illustrating a working flow of a method for compensating frequency response distortion of the communications device shown in FIG. 1 according to an embodiment of the present invention.

FIG. 2 is a diagram illustrating a working flow of a method for compensating frequency response distortion of a communications device such as the transceiver 10 shown in FIG. 1 according to an embodiment of the present invention. It should be noted that the working flow shown in FIG. 2 is for illustrative purposes only, and is not meant to be a limitation of the present invention. More particularly, one or more steps may be added, deleted or modified in the working flow shown in FIG. 2. In addition, if an overall result is not hindered, these steps do not have to be executed in the exact order shown in FIG. 2.

In Step S210, the communications device utilizes a transmitting path circuitry therein to generate an output test signal according to a pre-distortion test signal.

In Step S220, the communications device utilizes a receiving path circuitry therein to generate a first feedback signal according to the output test signal.

In Step S230, the communications device calibrates a pre-distortion circuit therein according to the first feedback signal.

Figure 3:
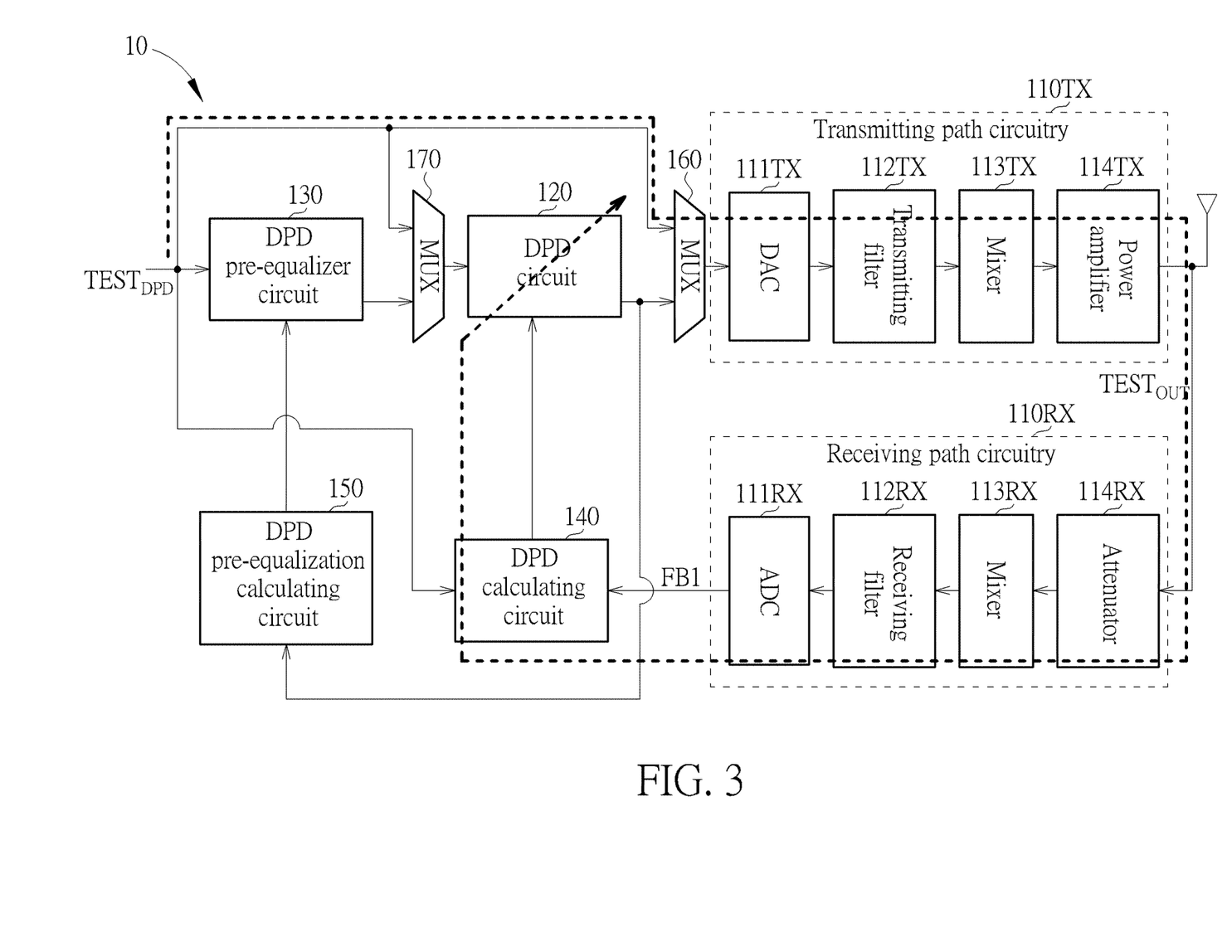
FIG. 3 is a diagram illustrating calibration of a DPD circuit within the communications device shown in FIG. 1 according to an embodiment of the present invention.

For better comprehension of the operations from Steps S210 to S230, refer to FIG. 3. The transceiver 10 (e.g. the controller therein) may control the MUX 160 to enable the upper path circuitry thereof and disable the lower path circuitry thereof to bypass the DPD pre-equalizer circuit 130 and the DPD circuit 120, in order to input a pre-distortion test signal $TEST_{DPD}$ to the transmitting path circuitry 110TX without pre-processing of the DPD pre-equalizer circuit 130 and the DPD circuit 120, and the pre-distortion test signal $TEST_{DPD}$ is thereby sequentially processed by the DAC 111TX, the transmitting filter 112TX, the mixer 113TX and the power amplifier 114TX for generating an output test signal $TEST_{OUT}$. The output test signal $TEST_{OUT}$ may be transmitted to the receiving path circuitry 110RX, and sequentially processed by the attenuator 114RX, the mixer 113RX, the receiving filter 112RX and the ADC 111RX for generating a first feedback signal FB1. The DPD calculating circuit 140 may compare the first feedback signal FB1 with the pre-distortion test signal $TEST_{DPD}$ to estimate non-linear distortion caused by the power amplifier 114TX, and accordingly calculate and derive a set of coefficients to be coefficients of a filter within the DPD circuit 120, to enable the DPD circuit 120 to perform pre-processing on the transmission signal for compensating the non-linear distortion caused by the power amplifier 114TX.

As the transmitting path circuitry 110TX comprises the transmitting filter 112TX and the receiving path circuitry 110RX comprises the receiving filter 112RX, after the transceiver 10 calibrates the DPD circuit 120 via the signal path circuitry shown in FIG. 3, a frequency response of the DPD circuit 120 may be distorted. For example, when both the transmitting filter 112TX and the receiving filter 112RX are low pass filters, as amplitude responses of the low pass filters will be suppressed in a high frequency band, performing equalizing compensation by the DPD circuit 120 which has been calibrated may make the amplitude response rise in the high frequency band. Thus, subsequent steps of the present invention estimate the frequency response of the DPD circuit 120 after calibration and accordingly perform pre-equalization processing, in order to solve the aforementioned frequency response distortion problem.

In Step S240, after calibration of the pre-distortion circuit is finished, the communications device utilizes the pre-distortion circuit to generate a second feedback signal according to a single tone signal.

In Step S250, the communications device calibrates a pre-equalizer circuit therein according to the second feedback signal.

Figure 4:
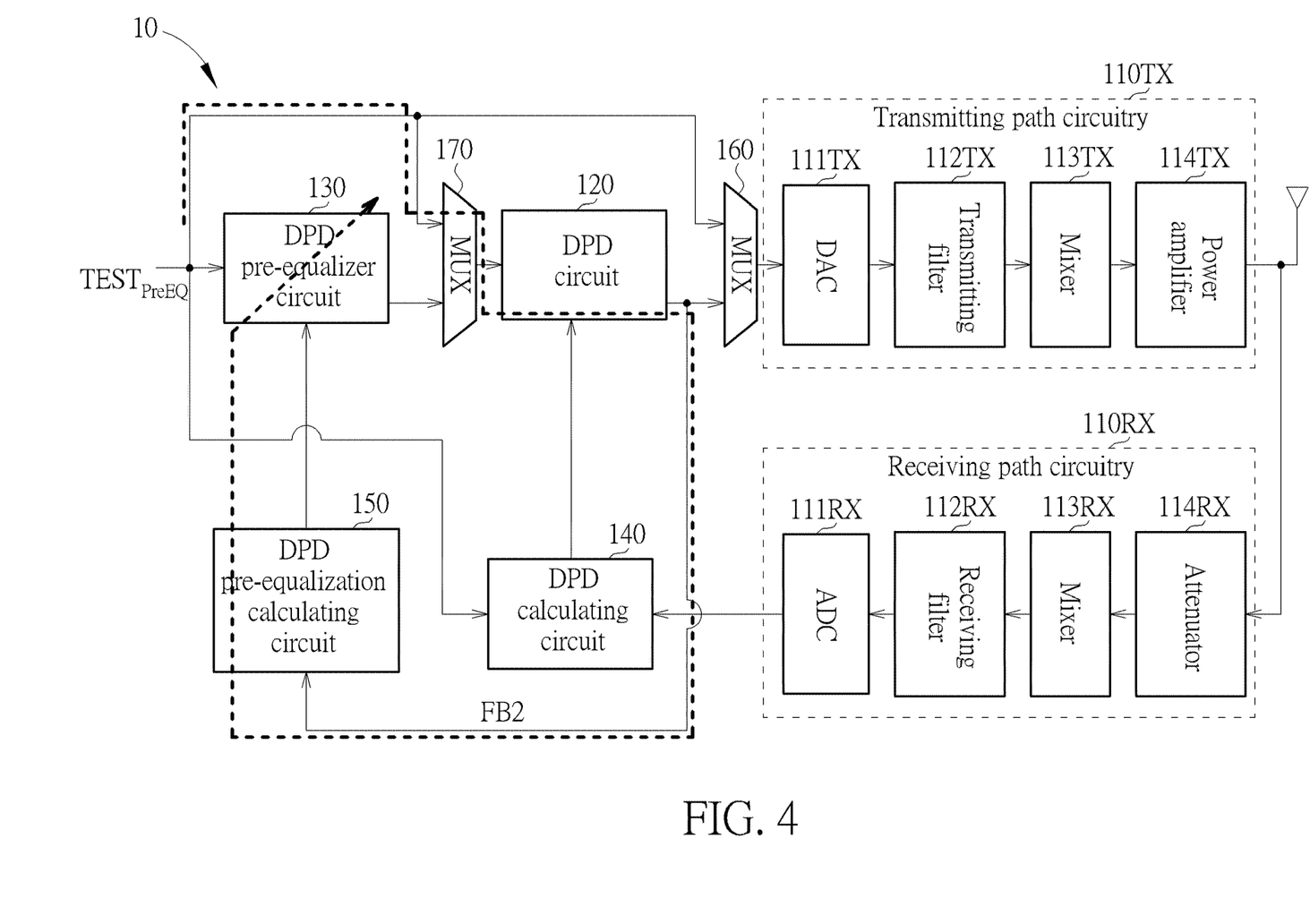
FIG. 4 is a diagram illustrating calibration of a DPD pre-equalizer circuit within the communications device shown in FIG. 1 according to an embodiment of the present invention.

For better comprehension of the operations from Step S240 to S250, refer to FIG. 4. The transceiver 10 (e.g. the controller therein) may control the MUX 170 to enable the upper path circuitry thereof and disable the lower path circuitry thereof to bypass the DPD pre-equalizer circuit 130, in order to input a single tone signal $TEST_{PreEQ}$ to the DPD circuit 120 without being pre-processed by the DPD pre-equalizer circuit 130. More particularly, after calibration of the DPD circuit 120 is finished in Step S230, the DPD circuit 120 may be enabled to generate a second feedback signal FB2 according to the single tone signal $TEST_{PreEQ}$. The DPD pre-equalization calculating circuit 150 may perform calculation according to the second feedback signal FB2 to derive a set of coefficients as coefficients of a filter within the DPD pre-equalizer circuit 130, to enable the DPD pre-equalizer circuit 130 to compensate the frequency response distortion generated by the DPD circuit 120 after calibration.

Figure 5:
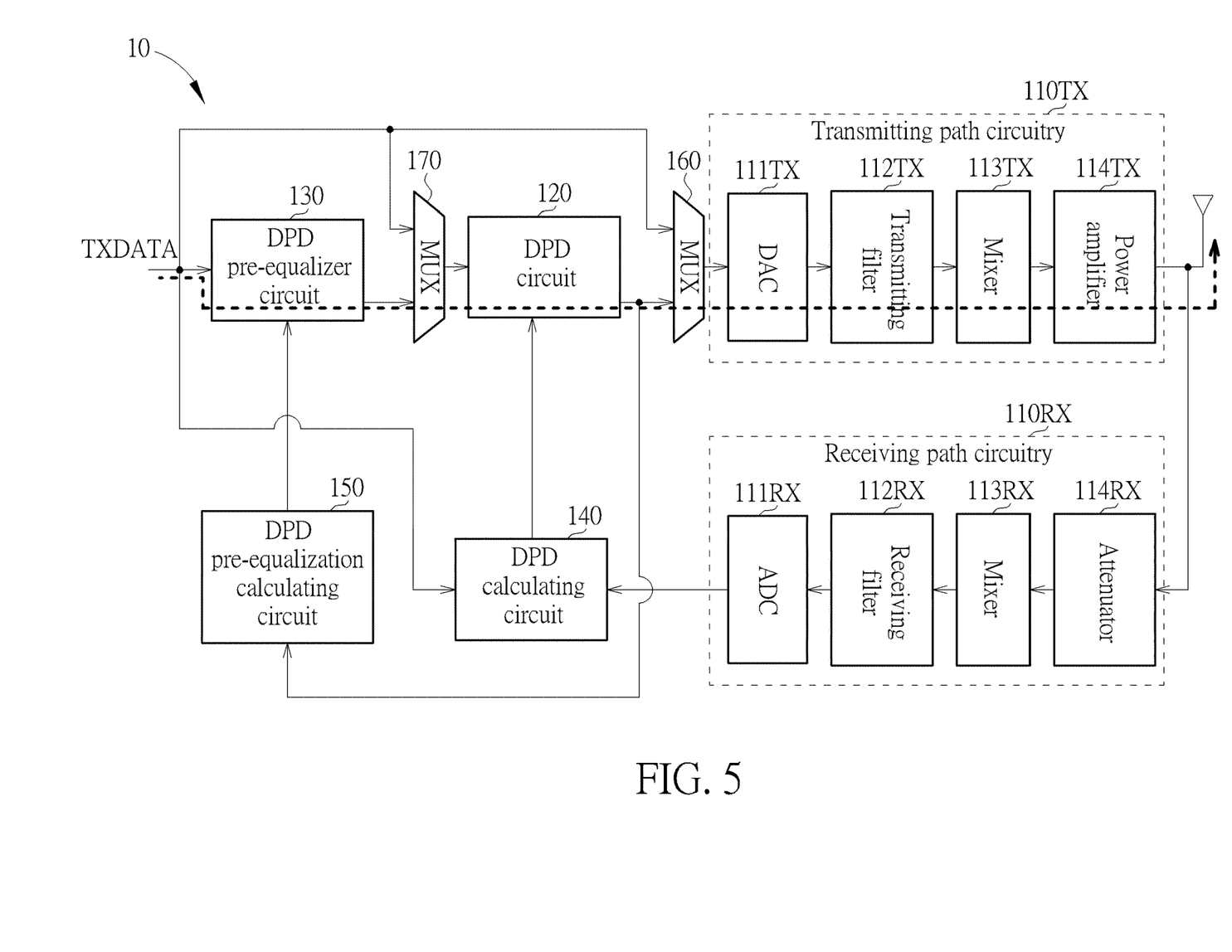
FIG. 5 is a diagram illustrating operations of the communications device shown in FIG. 1 after calibration of a DPD circuit and a DPD pre-equalizer circuit therein is finished according to an embodiment of the present invention.

As shown in FIG. 5, after calibration of both the DPD circuit 120 and the DPD pre-equalizer circuit 130 are finished, the transceiver 10 (e.g., the controller therein) may control the MUX 160 to enable the lower path circuitry thereof and disable the upper path circuitry thereof and control the MUX 170 to enable the lower path circuitry thereof and disable the upper path circuitry thereof, to make a transmission signal TXDATA be sequentially processed by the DPD pre-equalizer circuit 130 and the DPD circuit 120 first, and then output to outside the transceiver 10 via the transmitting path circuitry 110TX.

Figure 6:
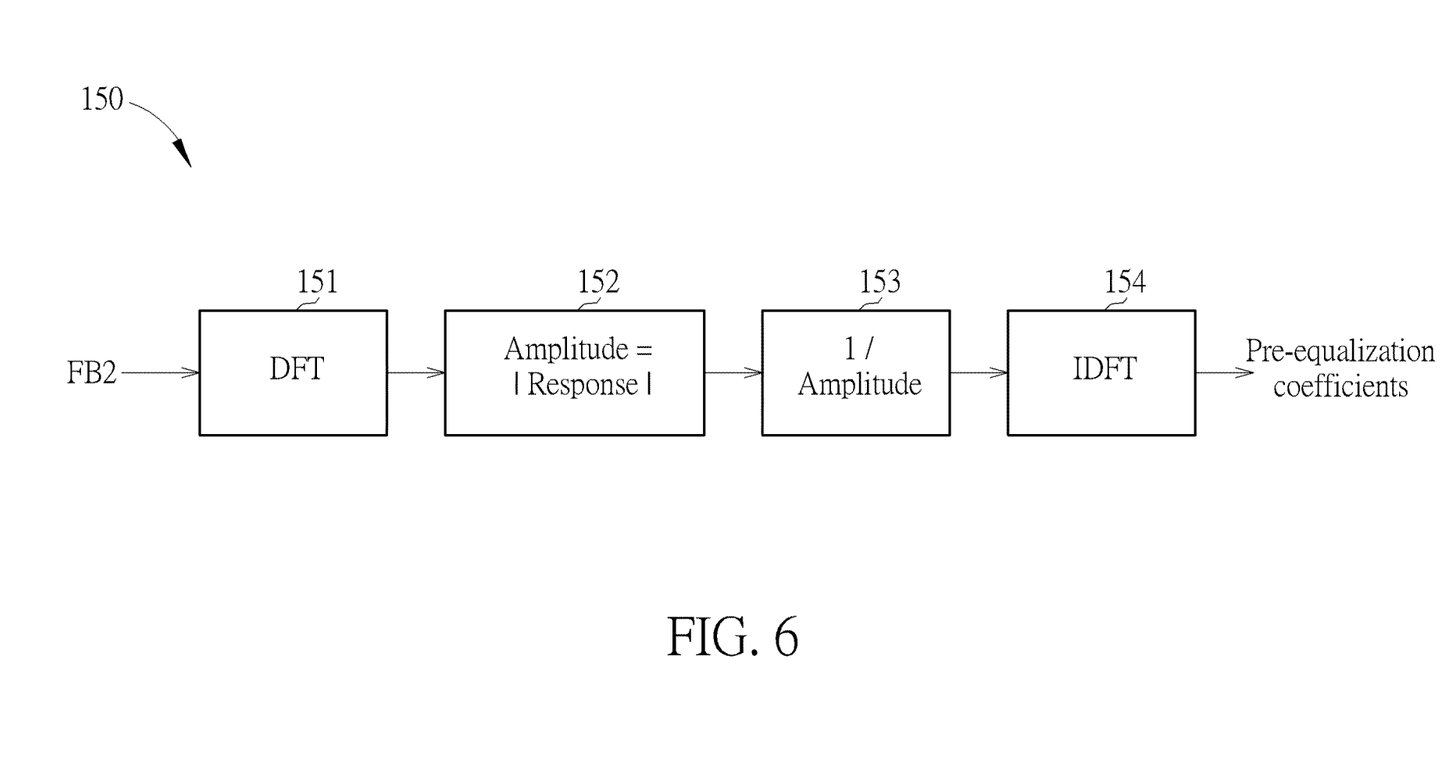
FIG. 6 is a diagram illustrating detailed implementation of a DPD pre-equalization calculating circuit according to an embodiment of the present invention.

FIG. 6 is a diagram illustrating detailed implementation of the DPD pre-equalization calculating circuit 150 according to an embodiment of the present invention. In this embodiment, the DPD pre-equalization calculating circuit 150 may perform frequency scanning on the single tone signal $TEST_{PreEQ}$ by multiple test frequencies, in order to obtain multiple compensation gains respectively corresponding to the multiple test frequencies according to the second feedback signal FB2, and calibrate the DPD pre-equalizer circuit 130 according to the multiple compensation gains. For example, the multiple test frequencies comprises M test frequencies (where M may be a positive integer greater than one), the DPD pre-equalization calculating circuit 150 may obtain a first compensation gain corresponding to a first frequency among the M test frequencies according to the second feedback signal FB2 under a condition of a frequency of the single tone signal $TEST_{PreEQ}$ being set to be the first frequency, and the DPD pre-equalization calculating circuit 150 may then obtain a second compensation gain corresponding to a second frequency among the M test frequencies according to the second feedback signal FB2 under a condition of the frequency of the single tone signal $TEST_{PreEQ}$ being set to be the second frequency. Therefore, as deduced by analogy, an $M^{th}$ compensation gain corresponding to an $M^{th}$ frequency among the M test frequencies may be obtained according to the second feedback signal FB2 under a condition of the frequency of the single tone signal $TEST_{PreEQ}$ being set to be the $M^{th}$ frequency.

As shown in FIG. 6, the DPD pre-equalization calculating circuit 150 may comprise a time-domain-to-frequency-domain transform circuit such as a Discrete Fourier Transform (DFT) circuit 151 (labeled "DFT" in FIG. 6 for brevity), a channel estimator such as an absolute value calculating circuit 152 (labeled "Amplitude=|Response|" in FIG. 6 for better comprehension), a reciprocal calculating circuit 152 (labeled "1/Amplitude" in FIG. 6 for better comprehension) and an Inverse Discrete Fourier Transform (IDFT) circuit 154 (labeled "IDFT" in FIG. 6 for brevity). Regarding operations of obtaining a compensation gain corresponding to any test frequency $f_{tone}$ among the multiple test frequencies, the DPD pre-equalization calculating circuit 150 may set the frequency of the single tone signal $TEST_{PreEQ}$ to be the test frequency $f_{tone}$, where the DPD pre-equalization calculating circuit 150 (e.g. the DFT circuit 151 therein) may perform time-domain-to-frequency-domain transform such as DFT (which may be implemented with Fast Fourier Transform (FFT) in practice) on the second feedback signal FB2 to obtain a frequency-domain transform result corresponding to the test frequency $f_{tone}$. Then, the DPD pre-equalization calculating circuit 150 (e.g. the absolute value calculating circuit 152) may perform absolute value calculation on the frequency-domain transform result to obtain an amplitude response value corresponding to the test frequency $f_{tone}$, and the DPD pre-equalization calculating circuit 150 (e.g. the reciprocal calculating circuit 152 therein) may perform reciprocal calculation on the amplitude response value to obtain the compensation gain.

For example, when the frequency of the single tone signal $TEST_{PreEQ}$ is set to be the test frequency $f_{tone}$, a time domain signal $S_{single\_tone}(t)$ may represent a value of the single tone signal $TEST_{PreEQ}$ corresponding to a time parameter t, where the time domain signal $S_{single\_tone}(t)$ may be expressed as follows:

$$S_{single\_tone}(t)=e^{2\pi f_{tone}t}$$

where "e" is Euler's number, and "$\pi$" is a mathematical constant which represents the ratio of a circle's circumference to its diameter. The DPD circuit 120 may perform pre-distortion processing on the time domain signal $S_{single\_tone}(t)$ to obtain a pre-distorted time domain signal $S_{single\_tone\_dpd}(t)$ as follows:

$$S_{single\_tone\_dpd}(t)=f_{dpd}(S_{single\_tone}(t))$$

where fpd( ) may represent an operator of the pre-distortion processing mentioned above. For example, the DPD circuit 120 may comprise a finite impulse response (FIR) filter, and this FIR filter may receive the time domain signal $S_{single\_tone}(t)$ and accordingly output the pre-distorted time domain signal $S_{single\_tone\_dpd}(t)$. Then, the DFT circuit 151 may perform DFT on the pre-distorted time domain signal $S_{single\_tone\_dpd}(t)$ based on a discrete parameter n to obtain a frequency domain signal $S_{single\_tone\_dpd}(f)$ corresponding to a frequency parameter f as follows:

$$S_{single\_tone\_dpd}(f) = \sum_{n=0}^{N-1} S_{single\_tone\_dpd}(n) \cdot e^{-j2\pi fn}$$

where "N" may represent the number of samples of $S_{single\_tone\_dpd}(n)$, and "j" may represent $\sqrt{-1}$. The channel estimator may perform channel estimation according to the frequency domain signal $S_{single\_tone\_dpd}(f)$ to obtain an amplitude response value $|S_{single\_tone\_dpd}(f)|$ and a phase response value $<S_{single\_tone\_dpd}(f)$ corresponding to the frequency parameter f. For example, the absolute value calculating circuit 152 may perform absolute value calculation on the frequency domain signal $S_{single\_tone\_dpd}(f)$ to obtain an amplitude response value $|S_{single\_tone\_dpd}(f_{tone})|$ corresponding to the test frequency $f_{tone}$.

Figure 7:
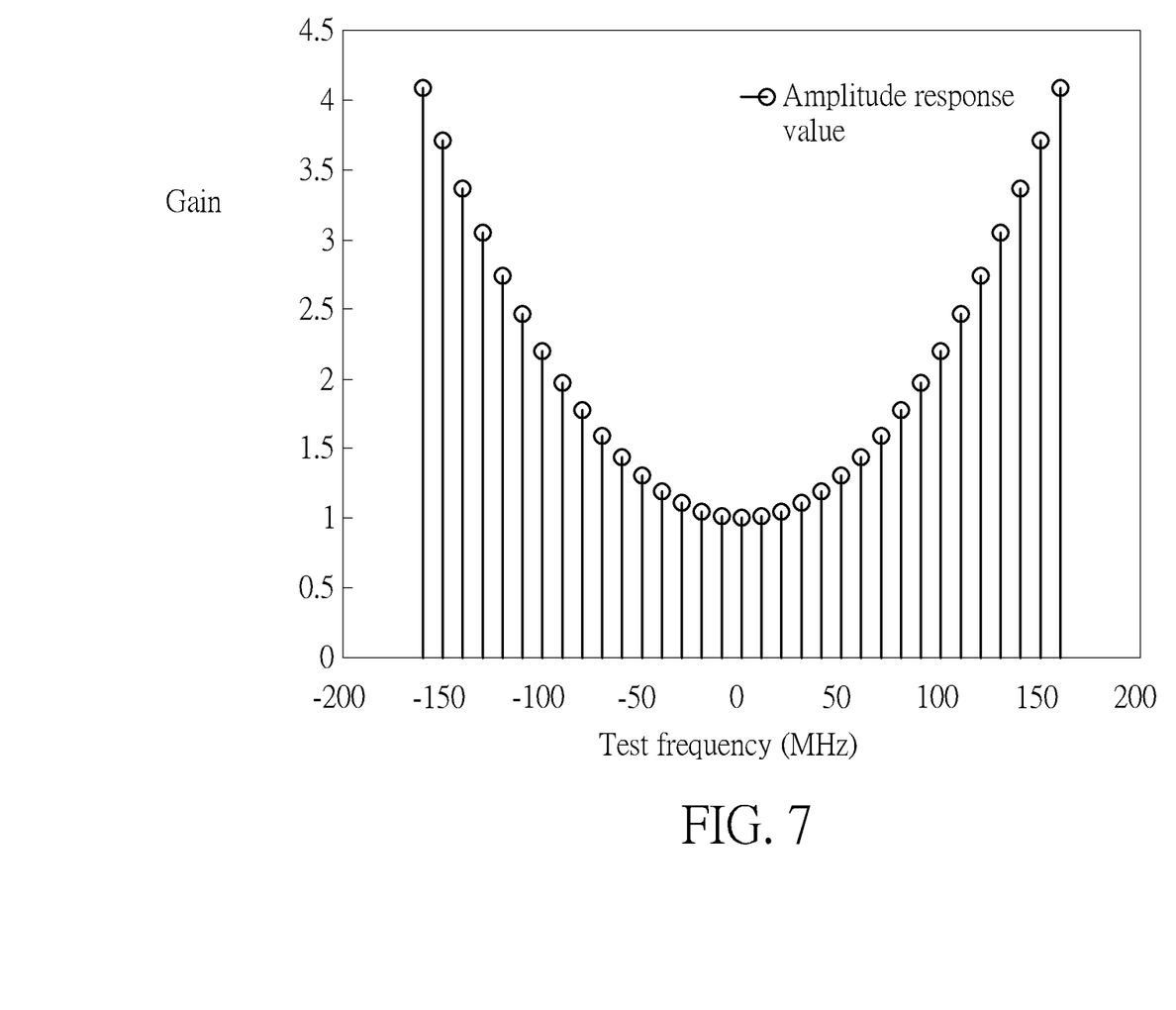
FIG. 7 is a diagram illustrating multiple amplitude response values respectively corresponding to multiple test frequencies according to an embodiment of the present invention.
Figure 8:
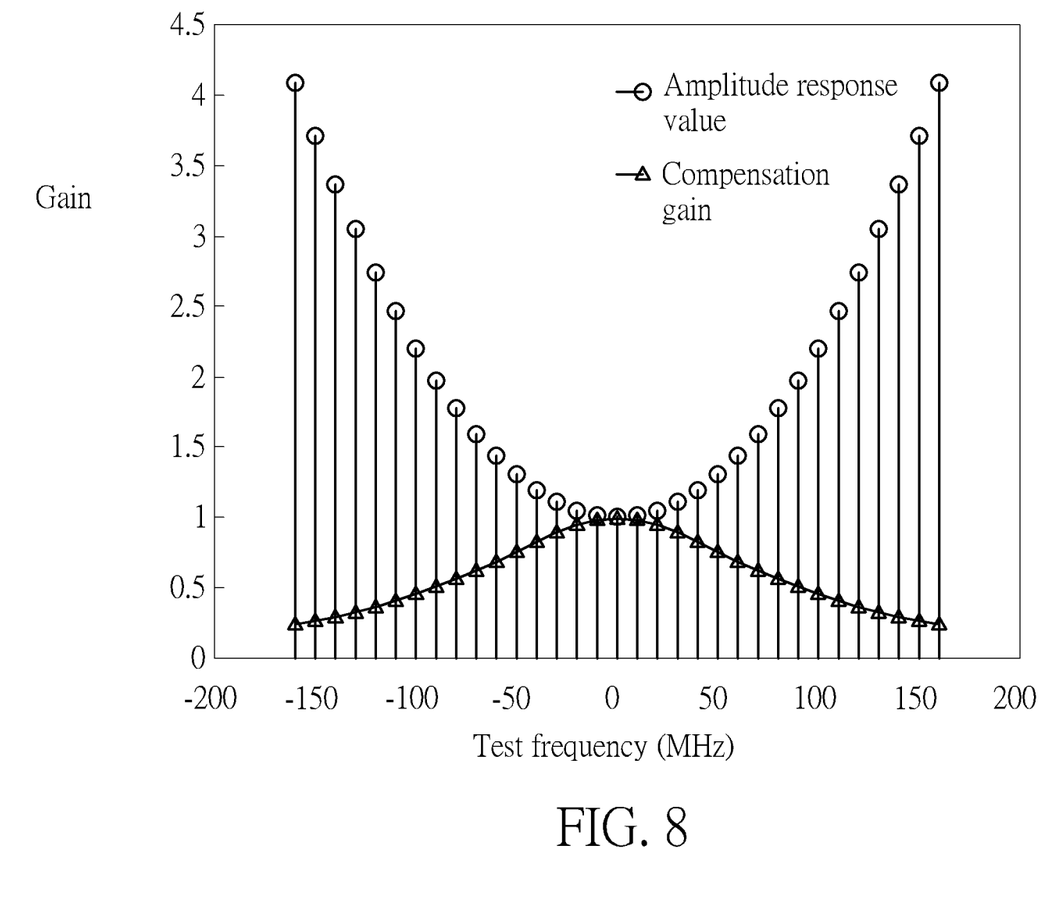
FIG. 8 is a diagram illustrating multiple compensation gains respectively corresponding to multiple test frequencies according to an embodiment of the present invention.

Assume that the DPD pre-equalization calculating circuit 150 performs frequency scanning on the single tone signal $TEST_{PreEQ}$ using multiple test frequencies with intervals of 10 megahertz (MHz) in a bandwidth of 320 MHz (e.g. from −160 MHz to +160 MHz). The absolute f) value calculating circuit 152 may obtain multiple amplitude response values $|S_{single\_tone\_dpd}(f)|$ respectively corresponding to the multiple test frequencies under conditions of the single tone signal $TEST_{PreEQ}$ being set as the multiple test frequencies, as shown in FIG. 7. As the DPD circuit 120 is calibrated under the condition of the signal path circuitry comprising low pass filter(s) thereon (e.g. the transmitting filter 112TX and the receiving filter 112RX), the DPD circuit 120 may have features similar to high pass filters after being calibrated. In order to compensate the high pass filter features generated by the DPD circuit 120, the reciprocal calculating circuit 153 may calculate a reciprocal of each of the multiple amplitude response values $|S_{single\_tone\_dpd}(f)|$ regarding each of the multiple test frequencies, to obtain multiple compensation gains $S_{PreEQ}(f)$ respectively corresponding to the multiple test frequencies, as shown in FIG. 8. For example, the reciprocal calculating circuit 153 may calculate a reciprocal of the amplitude response value $|S_{single\_tone\_dpd}(f_{tone})|$ under a condition of the frequency of the single tone signal $TEST_{PreEQ}$ being set as the test frequency $f_{tone}$, to obtain a compensation gain $S_{PreEQ}(f_{tone})$ corresponding to the test frequency $f_{tone}$ as follows:

$$S_{PreEQ}(f_{tone}) = \frac{1}{|S_{single\_tone\_dpd}(f_{tone})|}$$

After obtaining the multiple compensation gain $S_{PreEQ}(f)$ respectively corresponding to the multiple test frequencies, the IDFT circuit 154 may perform frequency-domain-to-time-domain transform such as IDFT (which may be implemented with Inverse Fast Fourier Transform (IFFT) in practice) on the multiple compensation gain $S_{PreEQ}(f)$, to obtain a set of coefficients (e.g. pre-equalization coefficients). For example, the DPD pre-equalizer circuit 130 may comprise a filter (e.g. an FIR filter or an infinite impulse response (IIR) filter), and the set of coefficients may be taken as coefficients of this filter, making this filter have an amplitude response formed by the multiple compensation gains $S_{PreEQ}(f)$ mentioned above.

It should be noted that each sub-circuit within the DPD pre-equalization calculating circuit 150 (e.g. the DFT circuit 151, the absolute value calculating circuit 152, the reciprocal calculating circuit 153 and the IDFT circuit 154) may be implemented by calculating circuits dedicated for the aforementioned calculations. In some embodiments, some complicated calculating circuits (e.g. the DFT circuit 151 and/or the IDFT circuit 154) within the DPD pre-equalization calculating circuit 150 may be implemented by dedicated calculating circuits, and some simple calculations (e.g. absolute value calculations and/or reciprocal calculations) may be executed by existing calculating circuits within the DFT circuit 151 and/or the IDFT circuit 154, or be executed by existing calculating circuits configured outside the DPD pre-equalization calculating circuit 150, but the present invention is not limited thereto.

To summarize, the present invention utilizes the DPD circuit 120 to perform pre-distortion processing on an input signal for compensating non-linear distortion of the power amplifier 114TX. As filters on signal paths may get involved in calibration of the DPD circuit 120, the frequency response of the DPD circuit 120 may be distorted (e.g. may have a high pass filter feature) after being calibrated. Thus, the present invention utilizes the DPD pre-equalizer circuit 130 to provide a frequency response (e.g. a low pass filter feature) which is able to cancel the frequency response of the DPD circuit 120, in order to compensate the frequency response distortion generated by the DPD circuit 120. The embodiment of the present invention will not greatly increase additional costs. Thus, the present invention can solve the problem of the related art without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communications device, comprising:
    a transmitting path circuitry, configured to generate an output test signal according to a pre-distortion test signal;
    a receiving path circuitry, configured to generates a first feedback signal according to the output test signal;
    a pre-distortion circuit, electrically coupled with the transmitting path circuitry, wherein the pre-distortion circuit is calibrated according to the first feedback signal, and is configured to generate a second feedback signal according to a single tone signal; and
    a pre-equalizer circuit, electrically coupled with the transmitting path circuitry;
    wherein after the pre-equalizer circuit is calibrated according to the second feedback signal, a transmission signal is outputted via the transmitting path circuitry after the transmission signal is processed by the pre-equalizer circuit and the pre-distortion circuit.

2. The communications device of claim 1, further comprising:
    a pre-equalization calculating circuit, configured to perform frequency scanning on the single tone signal using multiple test frequencies in order to obtain multiple compensation gains respectively corresponding to the multiple test frequencies according to the second feedback signal, and calibrate the pre-equalizer circuit according to the multiple compensation gains.

3. The communications device of claim 2, wherein regarding operations of obtaining a compensation gain corresponding to any test frequency among the multiple test frequencies, the pre-equalization calculating circuit sets a frequency of the single tone signal to be the test frequency, the pre-equalization calculating circuit performs time-domain-to-frequency-domain transform on the second feedback signal to obtain a frequency-domain transform result corresponding to the test frequency, the pre-equalization calculating circuit performs absolute value calculation on the frequency-domain transform result to obtain an amplitude response value corresponding to the test frequency, and the pre-equalization calculating circuit performs reciprocal calculation on the amplitude response value to obtain the compensation gain.

4. The communications device of claim 3, wherein the pre-equalizer circuit comprises a filter, and the pre-equalization calculating circuit performs frequency-domain-to-time-domain transform on the multiple compensation gains, in order to obtain a set of coefficients to be coefficients of the filter.

5. The communications device of claim 1, wherein the pre-distortion circuit is configured to compensate non-linear distortion of a power amplifier within the transmitting path circuitry.

6. The communications device of claim 1, wherein the pre-equalizer circuit is configured to compensate frequency response distortion generated by the pre-distortion circuit being calibrated under a condition of either of the transmitting path circuitry and the receiving path circuitry comprising a filter.

7. A method for compensating frequency response distortion of a communications device, comprising:
    utilizing a transmitting path circuitry of the communications device to generate an output test signal according to a pre-distortion test signal;
    utilizing a receiving path circuitry of the communications device to generate a first feedback signal according to the output test signal;

calibrating a pre-distortion circuit of the communications device according to the first feedback signal;

after the pre-distortion circuit is calibrated, utilizing the pre-distortion circuit to generate a second feedback signal according to a single tone signal; and calibrating a pre-equalizer circuit of the communications device according to the second feedback signal;

wherein after the pre-equalizer circuit is calibrated, a transmission signal is outputted via the transmitting path circuitry after the transmission signal is processed by the pre-equalizer circuit and the pre-distortion circuit.

8. The method of claim 7, wherein calibrating the pre-equalizer circuit according to the second feedback signal comprises:

performing frequency scanning on the single tone signal using multiple test frequencies in order to obtain multiple compensation gains respectively corresponding to the multiple test frequencies according to the second feedback signal; and calibrating the pre-equalizer circuit according to the multiple compensation gains.

9. The method of claim 8, wherein obtaining a compensation gain corresponding to any test frequency among the multiple test frequencies comprises:

setting a frequency of the single tone signal to be the test frequency;

performing time-domain-to-frequency-domain transform on the second feedback signal to obtain a frequency-domain transform result corresponding to the test frequency;

performing absolute value calculation on the frequency-domain transform result to obtain an amplitude response value corresponding to the test frequency; and performing reciprocal calculation on the amplitude response value to obtain the compensation gain.

10. The method of claim 9, wherein calibrating the pre-equalizer circuit according to the multiple compensation gains comprises:

performing frequency-domain-to-time-domain transform on the multiple compensation gains in order to obtain a set of coefficients to be coefficients of a filter within the pre-equalizer circuit.

11. The method of claim 7, wherein the transmission signal is processed by the pre-distortion circuit to compensate non-linear distortion of a power amplifier within the transmitting path circuitry.

12. The method of claim 7, wherein the transmission signal is processed by the pre-equalizer circuit to compensate frequency response distortion generated by the pre-distortion circuit being calibrated under a condition of either of the transmitting path circuitry and the receiving path circuitry comprising a filter.

\* \* \* \* \*